(12) United States Patent
Syvänne

(10) Patent No.: US 7,739,727 B2
(45) Date of Patent: Jun. 15, 2010

(54) METHOD OF MANAGING A NETWORK DEVICE, A MANAGEMENT SYSTEM, AND A NETWORK DEVICE

(75) Inventor: Tuomo Syvänne, Vantaa (FI)

(73) Assignee: Stonesoft Corporation, Helsinki (FI)

( * ) Notice: Subject to any disclaimer, the term of this patent is extended or adjusted under 35 U.S.C. 154(b) by 1409 days.

(21) Appl. No.: 10/127,684

(22) Filed: Apr. 23, 2002

(65) Prior Publication Data
US 2002/0157018 A1    Oct. 24, 2002

(30) Foreign Application Priority Data
Apr. 23, 2001    (FI) .................................. 20010831

(51) Int. Cl.
*G06F 15/16* (2006.01)
(52) U.S. Cl. ................. 726/11; 726/2; 726/3; 713/153; 713/166
(58) Field of Classification Search ......... 709/220–222, 709/11, 1, 100, 238–244, 223, 224, 225, 709/226; 726/11–12, 2, 3; 713/153, 154, 713/166; 370/349, 392, 401, 402
See application file for complete search history.

(56) References Cited

U.S. PATENT DOCUMENTS

| | | | |
|---|---|---|---|
| 5,390,324 A | | 2/1995 | Burckhartt et al. |
| 5,848,244 A | | 12/1998 | Wilson |
| 6,029,196 A | * | 2/2000 | Lenz ........................... 709/221 |
| 6,098,098 A | * | 8/2000 | Sandahl et al. .............. 709/221 |
| 6,243,815 B1 | * | 6/2001 | Antur et al. .................... 726/11 |
| 6,286,038 B1 | * | 9/2001 | Reichmeyer et al. ........ 709/220 |
| 6,978,301 B2 | * | 12/2005 | Tindal ........................ 709/223 |

FOREIGN PATENT DOCUMENTS

| | | |
|---|---|---|
| EP | 1 085 694 | 3/2001 |
| EP | 1 089 180 | 4/2001 |
| WO | WO 00/79738 A1 | 12/2000 |

* cited by examiner

*Primary Examiner*—Kimyen Vu
*Assistant Examiner*—Baotran N To
(74) *Attorney, Agent, or Firm*—Barnes & Thornburg LLP

(57) ABSTRACT

The present invention relates to a method of managing a network device, a network device, and a management system. A configuration of a firewall is changed over a network connection by a remote management system (10). The firewall (11) applies the change configuration after receiving a command from the management system (10). Shortly after the changed configuration is applied, the management system (10) takes a new connection to the firewall (11). With this new connection, the configuration is accepted for permanent use in the firewall (11). If a new connection is not successfully set-up within a given time limit, the firewall (11) will automatically return to use the old configuration. Thereby, the firewall (11) is able to restore from any loss of management connection caused by a mistake in the changed configuration.

14 Claims, 1 Drawing Sheet

METHOD OF MANAGING A NETWORK DEVICE, A MANAGEMENT SYSTEM, AND A NETWORK DEVICE

BACKGROUND OF THE INVENTION

The present invention relates to a remote management of network devices.

Firewall is a set of components forming a gateway in between two or more networks. Logically a firewall is a gateway which operates at the same time as a connector and a separator between the networks in a sense that the firewall keeps track of the traffic that passes through it from one network to another and restricts connections and packages that are defined as unwanted by the administrator of the system. Physically a firewall is a machine with appropriate software to do the tasks assigned to it. It can be a router, a personal computer (PC), or whatever that can be used for such purposes. Although firewalls are mostly used to connect Local Area Networks (LANs), i.e. internal networks to the Internet and to control from malicious attackers or undesired traffic in general, they may also be used to separate and connect different segments of internal network for security purposes. The advantages of having a firewall are numerous. It secures the network and can be used as a tool for monitoring the traffic especially from outside to inside of the network that is guarded by a firewall. Because all traffic intended to the internal network must pass through the firewall, most of the network security actions and policies can be concentrated in this particular point. This is of course a cost and administrative advantage.

However, the firewall cannot keep an effective security by itself. The firewall needs to be carefully installed and configured, and the security policy needs to be evaluated and updated regularly. The contemporary development towards very complicated networks that need to have multiple interfaces with the Internet for VPN (Virtual Private Network), the remote access, the e-business, the cache servers, etc. has increased the demands for administrative skills. With multi-international companies you have to have the ability to control multiple firewalls by the same administrator. You also need to have an ability to have flexible possibilities regarding security policies: at the same time there might be a need for corporate-wide security policy but some specific sites might also need some particularly "tailored rules".

Because the human factor plays a key role in failures of firewalls and security policies, it is important for a firewall and a system of firewalls to be easily administrable. Administrators should also be restricted to the level of their expertise so they would not do unintentionally something harmful. Only professional and authorized people should have access according to their skills to the firewalls or systems of firewalls. The firewalls are often managed by a remote management system using a network connection and secured (encrypted) communication. The firewall communicates with the management system, sending performance statistics, status information, and log data, while receiving policy updates and configuration changes.

Whenever the configuration, e.g. settings or software, of a network device are changed, there is always a risk that the connectivity is lost between a remote management system and the device. The reason for this may be e.g. a rule preventing a management connection to a firewall. In most cases it is a human error that creates such situation. Whenever the device is managed using a network connection, this means that it is not possible to fix a problem using a network connection.

Therefore, to fix a problem that prevents connecting the management system to a network device, there is a need to have another way of managing the device. Conventionally, the most common approach has been a console connection. Usually this means that the administrator must himself go to the managed device in order to fix the problem. However, sometimes the visit at the device site is not a realistic way to act at all. This is due to the fact that the network device to be managed can be in another building, another country or even in another continent. In such situation, it is typical that some or else must fix the problem locally, mostly according to instruction given by the administrator using a phone or a fax. Even this approach requires the availability of a suitable person near the device to be managed, i.e. a person who is trusted to have administrator rights and skilled enough to manage the device.

Therefore, there are some prior art approaches trying to minimize the skills needed from a person at a remote location. First one is a back-up modem link, i.e. the network device can be accessed by making a modem call to a given telephone number. However, for security reasons, the back-up modem link is not typically enabled all the time. The operator at the remote site has instructions how to enable the link, e.g. connecting a cable, turning on the power, etc.

A second one is an arrangement where a new configuration is first saved in a volatile memory (e.g. RAM) in a device and the current configuration (i.e. the configuration currently in use) is maintained in the permanent non-volatile memory in the device. Then the new configuration is started to be used in the device. If the new configuration is faulty, it is possible to return to the current configuration by rebooting the device. In this case the operator at the remote site needs to just reboot the device. Anyway the availability of a suitable person near the device is needed, since the device cannot be rebooted remotely. Another problem with this approach is that it is up to the administrator to decide to save a new configuration as a current configuration. The administrator may change the configuration many times without changing the current configuration. In that case, it is possible that after a reboot the device returns to a very old configuration that does not correspond to the current situation. Another possibility is that the administrator saves a new configuration as a current configuration without proper knowledge of whether the new configuration works correctly or not. In that case, rebooting the device does not fix the problem of a non-working configuration.

It is evident that a miss-configuration, which prevents even fixing the mistake, can lead to long periods of time during which the network is not available at all. This applies to all network devices, which are remotely managed, not only to the firewalls. However, the firewalls are more likely to have such problems, primarily because the firewalls are the only access points to a network and designed to prevent a traffic not allowed by the administrator. For example, a mistake with IP addressing, routing, anti-spoofing, network address translation, VPN definition, rules or with link speed or mode of a network card may create the described situation.

SUMMARY OF THE INVENTION

An object of the invention is to reduce the risk of loosing a management connectivity due to a misconfiguration of the network device.

This object of the invention is achieved according to the invention by a method of management, a network device, a management system, and computer-readable mediums as disclosed in the claims.

According to the present invention, a loss of management connectivity after a configuration changed is checked by setting up a new network connection to a device after the configuration changes are applied in the device. If it is still possible to set up a new connection and to perform the remote management after the configuration changes are applied, the new configuration is accepted for permanent use and saved permanently. If a new connection is not made and the new configuration accepted within a given time limit from starting to apply the new configuration, then the managed device automatically returns to use the previous saved configuration. The automatic returning back to use the old configuration restores also the connectivity to the management system and thereby makes it possible to fix the mistake. Thus, the effect of human mistakes is reduced. Further, in case of firewall, the availability of the network protected by the firewall is improved, since mistake in the configuration of the firewall does not prevent fixing the configuration.

BRIEF DESCRIPTION OF THE DRAWINGS

The preferred embodiments of the invention will be described with reference to attached drawings, in which.

DETAILED DESCRIPTION OF THE INVENTION

Figure 1:
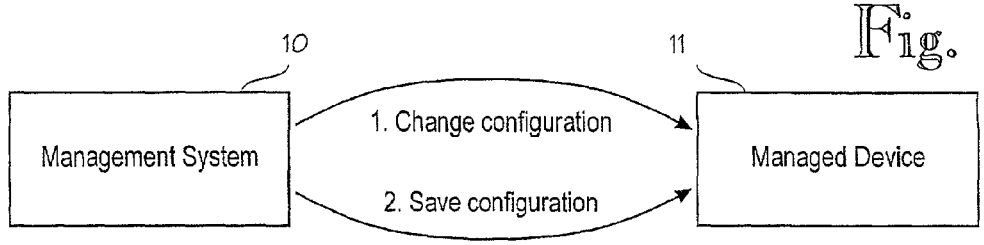
FIG. 1 illustrates the management system and a managed device.

Referring to FIG. 1, a network device 11, such as a firewall, is managed by a remote management system 10 over a network connection, typically over Internet. The network connection is preferably a secured connection and the communication is preferably encrypted. It should appreciated that any suitable network and communication protocol can be used for establishing the network connection between the management system 10 and the managed device 11.

Let us now assume that the administrator of the network device 11 desired to make changes in the configuration of the device 11. As used herein, the configuration is intended to include any settings or software which effect on the operation of the device 11. In the case of firewall, examples of configuration are IP addressing, routing, anti-spoofing, network address dress translation, and VPN definitions and rules, however, without restricting the invention to these examples.

Figure 2:
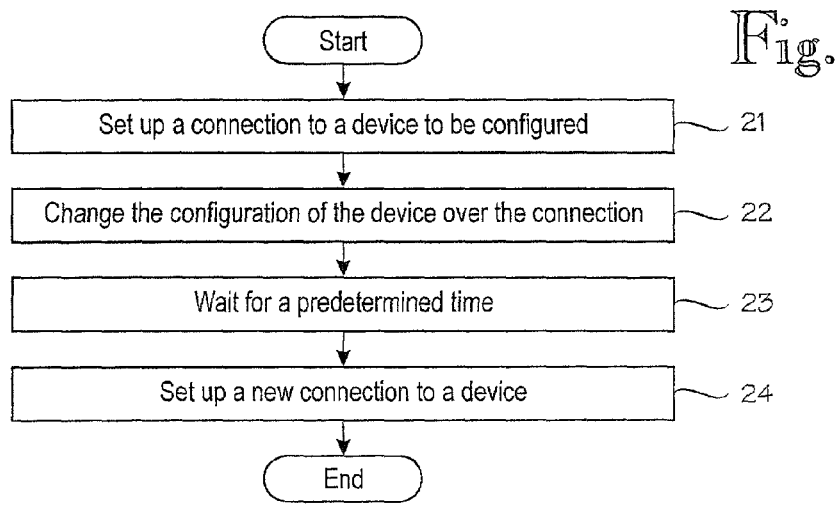
FIG. 2 is a flow diagram illustrating the operation of the management system.

Firstly, the administrator commands the management system 10 to set up a connection to the device 11 to be configured, as shown in step 21 in FIG. 2. Then the administrator uses the management system 10 to change the configuration of the device 11 over the established network connection (step 22 in FIG. 2). In an embodiment of the invention, the management system may also define timing parameters, such as date and/or time of day and/or a relative time, setting the time when the device should start to apply and use the changed configuration, if it is not to be applied immediately. This timing may be enable that several devices 11 (e.g. firewalls) can start to use a new configuration at the same time, although the configuration is loaded into different devices at different times. The device 11 receives the change of configuration (which may optionally include the timing parameters for timing the use of the changed configuration) from the management system 10 over the network connection, and considers the changed configuration as a "next configuration", as shown in step 31 in FIG. 3. The next configuration may be stored in a volatile memory (e.g. RAM) in the device 11, and the current configuration (i.e. the configuration currently in use) may be maintained in the permanent non-volatile memory in the device 11. Another possibility is to store both configurations in the non-volatile memory and to have two different pointers pointing to configurations. In the latter case, there may be several old configurations stored in the device. The different configurations may be numbered and the pointers may be for example next and current corresponding to the next configuration and the current configuration accordingly.

Then, the device 11 starts to apply the next configuration (i.e. the changed configuration). In an embodiment of the invention, the device 11 preferably 11 starts to apply the next configuration after a command received from the management system 11 over the network connection (step 32 in FIG. 3). The management system 10 waits for a predetermined period of time, ranging from milliseconds to dozens of seconds, and then tries to set up a new connection to the device 11 (steps 23 and 24 in FIG. 2). Alternatively, in another embodiment of the invention, the management system 10 may try to set up a new connection immediately after having changed the configuration and commanded to apply it. If the next configuration is a software update or new software, it is typical that when the next configuration is started to apply, the device 11 must be rebooted after having changed the configuration and commanded to apply it over the first connection.

In a still further embodiment of the invention, after having started to apply the changed configuration, the device 11 requests the management system to set up a new connection. This is especially applicable when the use of the changed configuration is timed, based on the timing parameters, for example. This is due to the fact that in the timed operation the management system 10 does not know the accurate time the device starts to use the changed configuration and thus can not accurately determine the time it should try to set up a new connection to the device 11. The request sent by the device 11 synchronizes the operation of device 11 and management 10 in this respect. It should be appreciated that it is not sufficient that the device 11 can open a connection to the management 10 and the management 10 responses over the same connection. The control connection shall be a new connection opened from the management 10 in response to the request from the device 11.

Figure 3:
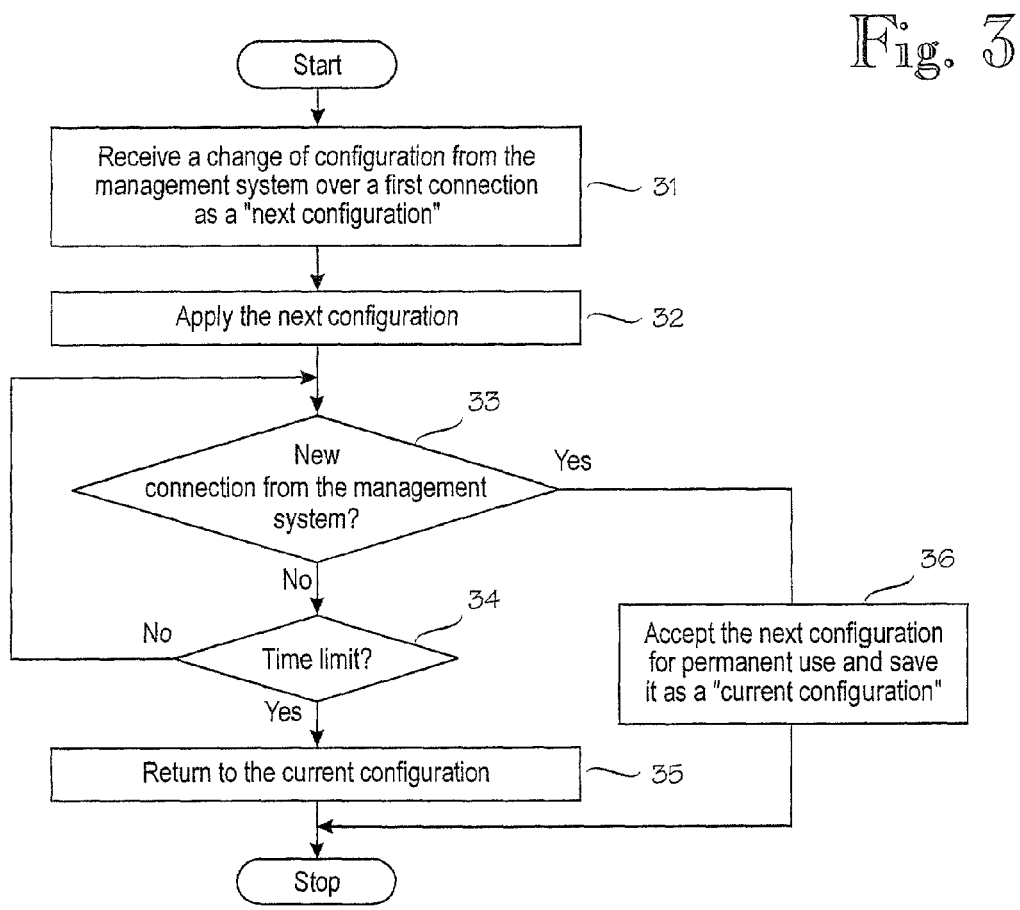
FIG. 3 is a flow diagram illustrating the operation of the managed network device.

Referring to FIG. 3, the device 11 monitors whether a new network connection is received from the management system 10 within a given time limit, e.g. 0, 5 to 30 seconds, preferably 1 to 10 seconds (steps 33 and 44) from starting to apply the changed configuration or sending the request. If a new network connection is received from the management system 10 within the time limit, the network device accepts the next configuration for permanent use. This may be done, for example, by saving the next configuration as a current configuration to the permanent non-volatile memory, thereby overwriting the previous configuration (step 36) or by rearranging the pointer current to point to the same configuration file with the next pointer. Device 11 may consider a network connection from the management system 10 to be successfully received, if a connection is set up. However, a successful connection set-up may also involve communication between the device 11 and the management system 10, or the network device 11 may even require a specific command from the management system 10 prior to permanently accepting the changed configuration.

If a new connection is not successfully set up from the management system 10 to the network device 11 (which may also involve communication between the network device 11 and the management system 10 as described above) within a given time limit, the network device 11 will automatically return to use the current configuration (i.e. the configuration used before the changes) in step 35. Thus, if there is a mistake in the new configuration which causes the network device 11 to fail or be not able to receive management connection from the management system 10, the network device 11 will automatically restore the normal operation by using the old configuration. The management system 10 is now able to make a further connection to the network device 11 in order to again reconfigure the network device. When the management system 10 is connected to the network device 11 first time after the network device 11 has restored the old configuration, the network device 11 preferably informs the management system 10 about this action. Further, if the network device 11 is for some reason power-cycled (turned off and on) or reinitialized before the final approval of the change configuration (e.g. during steps 33 and 34 in FIG. 3), the current configuration stored in the permanent non-volatile memory is used.

The same approach can be used whenever the software is modified (a software upgrade or patch) in a network device. Typical for the software updates is that there is a need for rebooting. The network device 11 must reboot once with the new software installed. If the reboot fails, the network device 11 crashes or is not able to receive a management connection, and therefore the device reboots again with the old software and/or the old configuration is used in accordance with the present invention. Only after successful use of the new software it is approved as a default software to be load at the boot time.

The present invention can be applied in all network devices, although it is especially useful with firewalls.

It will be apparent for those skilled in the art that the illustrative embodiments described are only examples and that various modifications can be made in the method, device and the system within the scope and spirit of the invention as defined in the appended claims.

The invention claimed is:

1. A method of managing a firewall device, said method comprising
setting up, by a management system in response to a command inputted by an administrator, a first network connection from the management system to a firewall device having a first configuration,
providing a second configuration to said firewall device by said management system over said first network connection, starting to apply said second configuration temporarily as a new configuration in said firewall device,
storing said first configuration as a fallback configuration in said firewall device,
starting, by said firewall device, an independent and automatic self-diagnostics procedure which includes
    (i) measuring, by said firewall device, a time elapsed after said temporarily starting to apply said second configuration as the new configuration,
    (ii) monitoring, by said firewall device, if a subsequent test network connection is received and successfully set up from said management system to said firewall device before said measured elapsed time exceeds a predetermined time limit in order to test operation of the new configuration,
    (iii) diagnosing, independently and automatically by said firewall device, that said temporarily applied second configuration operates correctly, setting said second configuration permanently as the new configuration in said firewall device, and ending said independent and automatic self-diagnostics procedure, if said second network connection is received and successfully set up before said measured elapsed time exceeds said predetermine time limit, and
    (iv) diagnosing, independently and automatically by said firewall device that said temporarily applied second configuration fails to operate correctly, ending application of said second configuration as the new configuration in said firewall device, and returning to use said stored first configuration in said firewall device, if said second network connection from said management system is not received and successfully set up to said firewall device before said measured elapsed time exceeds said predetermined time limit.

2. The method according to claim 1, comprising timing a moment at which said firewall device starts to apply the second configuration.

3. The method according to claim 1, comprising
returning to use said stored first configuration in said firewall device, if said firewall device is power cycled or reinitialized locally before said step of accepting, and
continuing using said second configuration in said firewall device, if said firewall device is power cycled or reinitialized after said step of accepting.

4. The method according to claim 1, comprising informing said management system of ending said application of said second configuration and returning to use said stored first configuration in said firewall device, when a third network connection is set up to said firewall device.

5. The method according to claim 1, wherein as least one of said first and second configurations comprises at least one of 1) software and 2) settings of said firewall device.

6. A method of managing a firewall device, said method comprising
setting up, by a management system in response to a command inputted by an administrator, a first network connection from the management system to a firewall device having a first configuration,
providing a second configuration to said firewall device by said management system over said first network connection,
said firewall device starting to apply said second configuration temporarily as a new configuration in said firewall device in a timed manner according to timing parameters defined during said providing step,
storing said first configuration as a fallback configuration in said firewall device, releasing the first network connection,
said firewall device starting an automatic and independent self-diagnostics procedure that requests said management system to set up a subsequent second test network connection upon said firewall device starts to temporarily apply the second configuration as the new configuration,
initiating a set up of said second test network connection from said management system to said firewall device in order to test the operation of the new configuration, and
said firewall device diagnosing independently and automatically that said second configuration operates correctly, and setting said temporarily applied second configuration permanently as the new configuration in said firewall device, if said self-diagnostics procedure detects that said second network connection is received and successfully set up, and
said firewall device diagnosing independently and automatically that said second configuration fails to operate correctly, and ending temporary application of said second configuration as the new configuration in said firewall device and returning to use said stored first configuration in said firewall device if said self-diagnostics procedure detects that said second connection from said management system is not received and set up within a predetermined period of time after starting to apply said second configuration as the new configuration in said firewall device.

7. A network device managed remotely by a management system, said device comprising
   a first mechanism configured to apply a first configuration in said network device,
   a second mechanism enabling said management system to provide a second configuration over a first network connection setup from said management system,
   a third mechanism configured to apply said second configuration temporarily as a new configuration in said network device,
   a memory configured to store said first configuration as a fallback configuration in said network device, and
   an independent and automatic self-diagnostics mechanism configured to independently-and automatically
      diagnose that said second configuration operates correctly, and to accept said temporarily applied second configuration for permanent use as the new configuration, if said self-diagnostics mechanism detects that a subsequent second test network connection is received and successfully set up from said management system within a predetermined period of time after starting to apply said second configuration temporarily as the new configuration in said network device, and
      diagnose that said second configuration fails to operate correctly to end application of said second configuration as the new configuration in said network device and to return said network device to use said stored first configuration if said self-diagnostics mechanism detects that said subsequent second test network connection is not received and successfully set up from said management system within a predetermined period of time after starting application of said second configuration temporarily as the new configuration in the network device.

8. The network device according to claim 7, wherein at least one of said first and second configuration comprises at least one of 1) software and 2) settings of said network device.

9. The network device according to claim 7, wherein said network device comprises timing mechanism configured for timing a moment at which said device starts to apply the second configuration as the new configuration.

10. The network device according to claim 9, wherein said network device is arranged to request said management system to set up said second test network connection when said network device starts to apply the second configuration as the new configuration.

11. A system comprising a network device and a management system for remote management of said network device, wherein said management system includes
    a first mechanism configured to, in response to a command inputted by an administrator, set up a first network connection to said network device for changing a configuration temporarily to a new configuration and for storing an old configuration as a fallback configuration in said network device, and
    a second mechanism for setting up a new test connection to said network device within a predetermined period of time after said first network connection or after a request from said network device, in order to approve said changed configuration for a permanent use as the new configuration in said network device if the test connection is successful, while a failure to set up said test connection causes the network element to return to use said stored fallback configuration, and
    wherein said network device includes
    a third mechanism configured to apply said changed configuration temporarily as the new configuration in said network device,
    a memory configured to store the old configuration as a fallback configuration in said network device, and
    an automatic and independent self-diagnostics mechanism configured to automatically and independently diagnose that said second configuration operates correctly, and to accept said temporarily applied new configuration for permanent use as the new configuration, if said self-diagnostics procedure detects that the test network connection is successfully received and set up from said management system within a predetermined period of time after starting to apply said changed configuration temporarily as the new configuration in said network device, and diagnose that said second configuration fails to operate correctly, and to end to apply said changed configuration as the new configuration in said network device and to independently return said network device to use said stored old configuration if said self-diagnostics mechanism detects that a subsequent second test network connection is not received and successfully set up from said management system within a predetermined period of time after starting to apply said second configuration temporarily as the new configuration in said network device.

12. The management system according to claim 11, wherein at least one of said new and fallback configurations comprises at least one of 1) software and 2) settings of said network device.

13. The management system according to claim 11, wherein said management system is intended for managing firewalls.

14. A computer-readable storage medium, containing a computer software, wherein executing said software in a computer causes the computer to operate as a firewall device and to execute the steps of
    using a first configuration in said firewall device,
    receiving a second configuration over a first network connection from a management system,
    applying said second configuration temporarily as a new configuration in said firewall device,
    storing said first configuration as a fallback configuration in said firewall device, an independent and automatic self-diagnostics procedure that includes
       (i) monitoring if a subsequent second test network connection is received and successfully set up from said management system to said firewall device within a predetermined period of time after starting to apply said second configuration in order to test operation of the new configuration,
       (ii) diagnosing independently and automatically that said second configuration operates correctly, and accepting said temporarily applied second configuration permanently as the new configuration in said firewall device, if said self-diagnostics procedure detects that the subsequent second test network connection is received and successfully set up from said management system to test the new configuration, and
       (iii) diagnosing independently and automatically that said second configuration fails to operate correctly, and ending said temporary application of said second configuration as the new configuration in said firewall device and returning to use said stored first configuration in said firewall device if said self-diagnostics procedure detects that said second test network connection fails or is not setup within a predetermined period of time after starting to apply the second configuration temporarily as the new configuration.

* * * * *